Patented Mar. 11, 1941

2,234,672

UNITED STATES PATENT OFFICE 2,234,672

PROTECTIVE COMPOSITION

C. Roy Gleason, Chicago, Ill., assignor to Insolna Corporation, New Orleans, La., a corporation of Louisiana No Drawing. Application August 22, 1938,
Serial No. 226,137

2 Claims. (Cl. 260—739)

This invention is directed to new and useful improvements in protective composition and method of applying same. The primary object of this invention is to provide a water glass or a silicate solution that may be applied to paper, paper products, textiles, wood products, and similar pervious materials by coating, saturation or impregnation of such articles to preserve and protect the articles so treated from deterioration due to moisture, oil or grease, animal and vegetable life, and will also resist the attacks of fire.

A further object of this invention is to provide such a composition that when applied to such materials will give a clear transparent film on the material so treated, will stiffen the material so treated, will provide a wearing surface on the material and will also be flexible and non-efflorescent. A still further object of this invention is to provide such a silicate solution that cannot be removed from materials to which applied by water leaching and will afford a definite protection against wet rot, mildew, humidity and fire.

Silicate coatings heretofore used tend to become brittle and are not resistant to the action of water or moisture. The carbon dioxide in the air acts upon such a coating or film to decompose it leaving the article so treated with little or no protection.

I am aware that attempts have been made to produce a water insoluble silicate solution by combining with commercial water glass hardening agents such as formaldehyde. United States Letters Patent to Thoretz, No. 1,832,752 describes such a coating composition that when dried will be insoluble in water. The mere fact that such a composition is insoluble in water when hardened is insufficient in the treatment of most materials unless the resultant film or coating is also flexible and strong. I will show that by combining certain other ingredients with the heretofore known water glass-formaldehyde type of water insoluble composition the desired additional characteristics will be obtained.

The protective composition hereinafter described in detail when applied to paper, paper products, textiles, or like pervious articles will provide a protective coating that is insoluble in water and will remain flexible. It furthermore has distinct adhesive characteristics which together with its other qualities makes it valuable in the manufacture of laminated paper products such as boxes.

I have discovered that by combining commercial water glass with water, formaldehyde or similar hardening agent and latex, a composition is obtained that when applied to articles and material as above mentioned and dried will produce a protective film having the characteristics mentioned. The latex combines with the silicate solution to cause the resultant film or coating when dry to be entirely flexible.

The preferred formula for preparing the protective composition which is the subject of this invention is as follows: One-half gallon sodium silicate solution 40°–42° Baumé, one-half gallon of water, one-half to three liquid ounces of formaldehyde. This mixture is thoroughly stirred. Then add from one to two liquid ounces of a 40% to 60% latex dispersion which is stirred into the mixture. The composition is then ready for use. If substantially more than the above given maximum amount of latex dispersion is added the latex will coagulate, will be thrown out and will materially interfere with the effectiveness of the composition.

To further improve the film or coating resulting from the application of this composition I have found that the addition of a colloidal sulphur dispersion containing approximately 50% by weight of solid sulphur is desirable. If for example paper or fabrics are treated with this composition including the colloidal sulphur and are passed through hot rollers having a temperature of 150° to 200° Fahrenheit, the sulphur will vulcanize the rubber to increase the life and effectiveness of the film.

I have found that the preferred amount of the colloidal sulphur dispersion to be added to the composition obtained from the above preferred formula is from about one-tenth to two-tenths of an ounce. In other words the amount of solid sulphur to be added is substantially 10% by weight of the solid latex contained in the latex dispersion.

Whether or not the sulphur is added to the composition a smoother, softer, more flexible film is obtained by passing the material treated with this composition through heated rollers as above described.

It is evident that if a color to the film is desired vegetable dye or pigments may be added as needed.

Other hardening agents are known to be the equivalent of formaldehyde and may be substituted therefor in substantially the same proportions such as urea, para-formaldehyde, the aldehydes generally, carbonates or alkali metals, soluble chlorides, sucrose, dextrose, and the like.

It should be clearly understood that the formaldehyde referred to in the preferred formula is the commercial formaldehyde which is a water solution comprising 37% to 40% of formaldehyde gas.

I do not limit myself to this definite formula above given but can increase the viscosity of the silicate solution to a point which is best suitable for its application to the various articles to be treated.

The invention herein disclosed and described is directed to the addition of latex to a silicate solution as well as the addition thereto of colloidal sulphur and the treatment of materials so impregnated or coated with such a composition to secure the advantages above set forth.

I claim:

1. A protective composition consisting essentially of water glass, water, formaldehyde, and latex dispersion in about the proportions of one-half gallon water glass, one-half gallon water, from one-half to three ounces of formaldehyde, and from one to two ounces 40 to 60% latex dispersion.

2. A protective composition consisting essentially of water glass, water, formaldehyde, latex dispersion and colloidal surphur dispersion in about the proportions of one-half gallon water glass, one-half gallon water, one-half to three ounces of formaldehyde, one to two ounces of 40 to 60% latex dispersion, and sulphur dispersion containing solid sulphur to the extent of about 10% by weight of the solid latex.

C. ROY GLEASON.